UNITED STATES PATENT OFFICE.

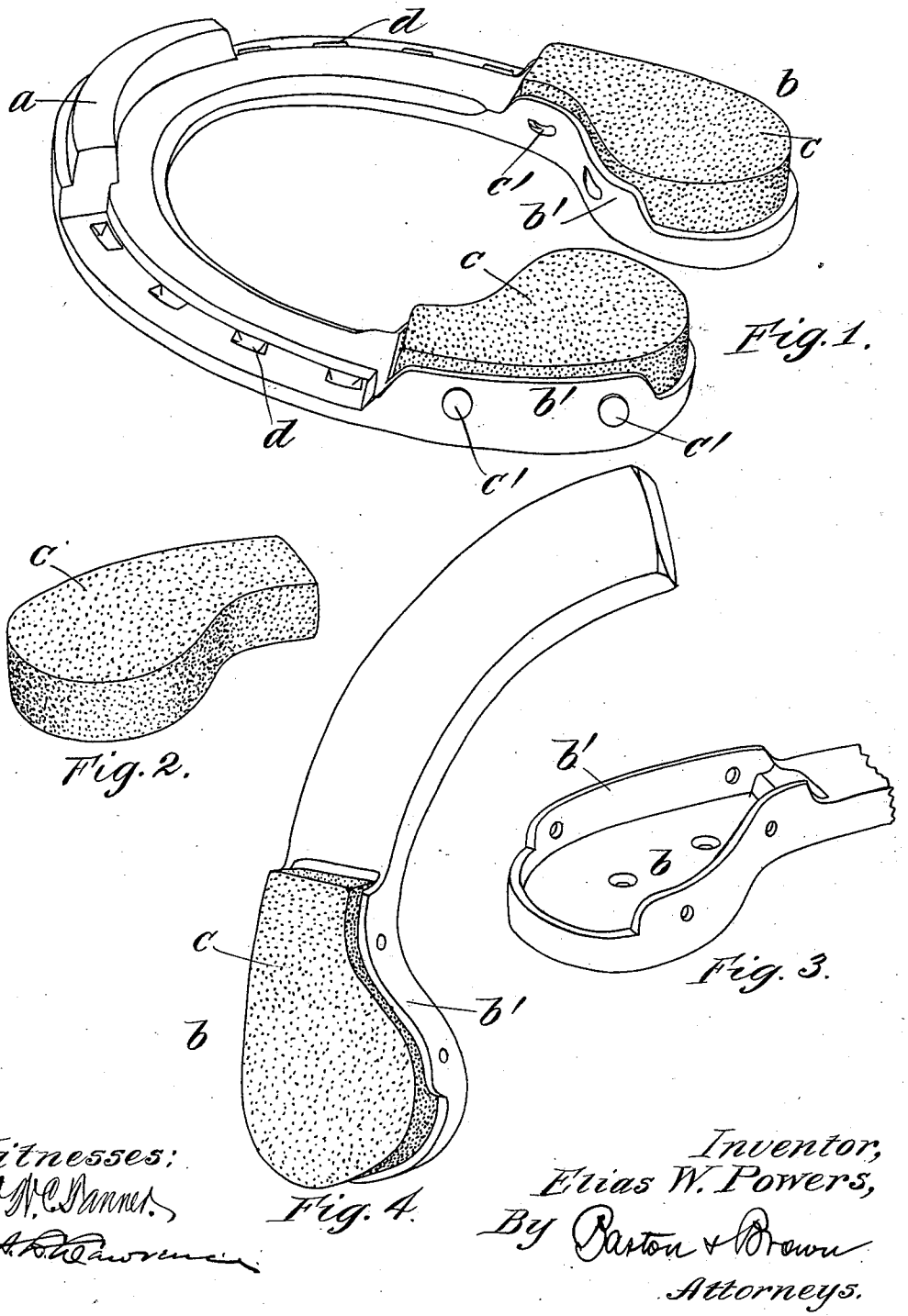

ELIAS W. POWERS, OF CHICAGO, ILLINOIS.

HORSESHOE.

SPECIFICATION forming part of Letters Patent No. 626,768, dated June 13, 1899.

Application filed February 2, 1899. Serial No. 704,271. (No model.)

*To all whom it may concern:*

Be it known that I, ELIAS W. POWERS, a citizen of the United States, residing at Chicago, in the county of Cook and State of Illinois, have invented a certain new and useful Improvement in Horseshoes, (Case No. 1,) of which the following is a full, clear, concise, and exact description.

My invention relates to improvements in horseshoes, and has for its object the provision of means for protecting the frog of the horse's foot in connection with large pads or surfaces of material adapted to prevent slipping, which preferably occupy the general position of the heel-calks of the shoe and which, furthermore, are removable and reversible, whereby the life of such pads is greatly increased.

For the yielding surfaces of my improved horseshoe I preferably provide molded blocks of rubber, which fit in casings of similar shape provided at the heels of said shoe. As is well known, however, when rubber calks are employed in horseshoes the material being subjected to unusual wear involves frequent renewal, which not only is expensive, but requires that considerable attention be paid to the shoes of the animal.

The horseshoe of my invention may be briefly described as consisting of a shoe having expanded heel portions, which are provided with casings wherein are removably secured molded pads or blocks of rubber or other suitable material, and a toe-clip of any suitable pattern, preferably formed integrally with the shoe.

My invention will be more readily understood by reference to the accompanying drawings, forming a part of this specification, wherein—

Figure 1 is a perspective view of a horseshoe constructed in accordance with my invention. Fig. 2 is a view of one of the reversible blocks or pads formed of material adapted to prevent slipping, which fits within the heel-calk casings of my improved horseshoe. Fig. 3 shows one of the heel-calk casings with the block removed; and Fig. 4 is a perspective view of the horseshoe-blank, a pair of which may be welded together or otherwise united to form a shoe of any desired size.

The same letters of reference are used to designate like parts in each of the several figures of the drawings.

As shown in Fig. 1, the horseshoe of my invention is provided with an iron toe-calk $a$, formed integrally with the body of the horseshoe, while the heel-calk portions $b$ are expanded to extend inwardly over and protect the frog. The portions $b$ are so shaped as to form casings or receptacles $b'$ similar but reversed in outline, wherein blocks of rubber $c$, suitably molded to fit therein, are adapted to be placed and are secured in position by means of pins or nails $c'$ passing through the side walls of the casings $b'$. These blocks $c$ may, as stated, be formed of rubber suitably molded to fit within the casings $b'$, or they may be constructed of other material adapted to prevent slipping—such as leather, felt, rawhide, or fiber—and being identical in shape are adapted when worn to be reversed in their positions within the casings, thereby presenting fresh surfaces for the tread of the shoe. The quarters $d$ of the shoe are exteriorly channeled or cut away and are provided with nail-holes, through which the nails are driven to secure the shoe in position upon the hoof of the horse. In placing the rubber blocks $c$ in position I have found that ordinary wire nails are well adapted for the purpose, inasmuch as they may be readily obtained at any time when it is desired to change or reverse the said blocks.

When a horse is shod with shoes constructed in accordance with my invention, it will be seen that the metallic toe-calks $a$ will enable the horse to obtain the necessary purchase when traveling over ordinary roads, while the rubber blocks, in addition to assisting in securing this result, will be found particularly desirable in obtaining a secure though slightly-yielding foothold for the horse when he is traveling over paved streets and boulevards. The expanded portions $b$, moreover, at all times extend over and protect the frog, while providing seats or receptacles for a large surface of non-slipping material in the shoe. After the shoes have been in use some time the rubber surfaces will be worn down approximately level with the lateral walls of the casings $b'$, when the blocks may readily be removed by pulling out the pins $c'$ and transposing the two blocks of each shoe, which serves to present unworn surfaces for the tread thereof, thereby increasing the wear of the rubber blocks.

By employing a pair of blanks, one of which is shown in Fig. 4, it will be seen that a shoe may be readily constructed by any blacksmith which will be of the requisite size and shape. Furthermore, the heel-calk portions $b$, one of which is shown in Fig. 3, may be attached to an ordinary shoe by means of screws or rivets, thereby securing the desirable result stated above.

I preferably construct the shoe, as shown in Fig. 1, of drop-forgings or blanks of the form illustrated in Fig. 4. The blacksmith being provided with blanks welds a pair together of the desired size and shape, placing the toe-calk at the point where the two blanks are joined.

From a consideration of my description it will be understood that the construction readily lends itself to a shoe of light weight, since the several parts, including the walls of the casings, may be materially reduced in thickness without impairing the usefulness of the shoe.

Having now particularly described my invention, what I claim as new, and desire to secure by Letters Patent, is—

1. As a new article of manufacture a horseshoe having an integral toe-calk $a$ and expanded heel-calk portions $b$ constructed in the form of casings $b'$ of similar shape wherein are removably secured reversible blocks $c$ of rubber or other suitable material, substantially as described.

2. As a new article of manufacture a horseshoe having a metallic toe-calk $a$ and heel-calk portions $b$ extending inwardly to cover the frog, said heel-calk portions being constructed of similar shape and in the form of casings $b'$ wherein are removably secured reversible blocks of rubber or other suitable material by means of transverse pins $c'$ passing through the walls of the casings and the bodies of the blocks, substantially as described.

3. A horseshoe consisting of two blanks of drop-forgings welded together, a toe-calk spanning the two blanks when united, said shoe being provided with inwardly-expanded recesses in combination with symmetrical rubber blocks suitably molded to fit therein and adapted to be transposed, substantially as and for the purpose specified.

In witness whereof I hereunto subscribe my name this 31st day of January, A. D. 1899.

ELIAS W. POWERS.

Witnesses:
GEORGE L. CRAGG,
A. LYNN LAWRENCE.